United States Patent
Hsieh

(10) Patent No.: US 6,992,677 B2
(45) Date of Patent: Jan. 31, 2006

(54) SYSTEM AND METHOD FOR ACCELERATING TWO-DIMENSIONAL GRAPHICS IN A COMPUTER SYSTEM

(75) Inventor: Phil Hsieh, Sindian (TW)

(73) Assignee: VIA Technologies, Inc., Taipei (TW)

( * ) Notice: Subject to any disclaimer, the term of this patent is extended or adjusted under 35 U.S.C. 154(b) by 8 days.

(21) Appl. No.: 10/734,254

(22) Filed: Dec. 15, 2003

(65) Prior Publication Data

US 2004/0174371 A1 Sep. 9, 2004

(30) Foreign Application Priority Data

Mar. 5, 2003 (TW) .............................. 92104631 A

(51) Int. Cl.
- G09G 5/37 (2006.01)
- G09G 5/36 (2006.01)
- G06F 13/14 (2006.01)

(52) U.S. Cl. ....................... 345/562; 345/520; 345/559

(58) Field of Classification Search ................ 345/562, 345/530, 520, 561, 559
See application file for complete search history.

(56) References Cited

U.S. PATENT DOCUMENTS 5,764,243 A * 6/1998 Baldwin ...................... 345/506
6,026,239 A * 2/2000 Patrick et al. ............... 717/154
6,707,457 B1 * 3/2004 Bates ......................... 345/503

OTHER PUBLICATIONS

"Graphics Accelerator", http://www.webopedia.com/TERM/graphics_accelerator.html.*
Strauch, Joel; "How It Works: Graphics Boards"; Oct. 9, 2000; http://www.pcworld.com/howto/article/0,aid,31050,00.asp.*
"Microsoft Windows CE Graphics Features", http://www.microsoft.com/technet/prodtechnol/wce/evaluate/graphics.mspx.*

* cited by examiner

Primary Examiner—Kee M. Tung
Assistant Examiner—Joni Hsu
(74) Attorney, Agent, or Firm—Bacon & Thomas, PLLC

(57) ABSTRACT

A system and method for accelerating 2D graphics in a computer system is disclosed, which has an graphic chip to perform graphic commands, each graphic command having an operation of a source pixel, a pattern and a destination pixel; and a 2D graphic device driver to set a command register of the graphic chip such that the graphic chip performs a graphic command. When the source pixel and the pattern of the graphic command received by the 2D graphic device driver are both colored, a copy procedure is performed to copy memory corresponding to the source pixel or the pattern and convert corresponding color for display. In addition, the 2D graphic device driver sets the command register of the graphic chip to perform a graphic command operation according to the source pixel or the pattern copied, the remaining one not copied and the destination pixel.

7 Claims, 4 Drawing Sheets

SYSTEM AND METHOD FOR ACCELERATING TWO-DIMENSIONAL GRAPHICS IN A COMPUTER SYSTEM

BACKGROUND OF THE INVENTION

1. Field of the Invention

The present invention relates to the technical field of graphic processing and, more particularly, to a system and method for accelerating two-dimensional (2D) graphics in a computer system.

2. Description of Related Art

As shown in FIG. 1, a personal computer (PC) system typically comprises a processor 110, a north bridge 120, a system memory 130, a graphic chip 140, a video memory 150 and a display 160. The processor 110 executes a window operating system (OS) via the north bridge 120 and stores corresponding data in the system memory 130. Graphic data can be stored in the system memory 130 or the video memory 150. The graphic chip 140 performs graphical operations to decrease the computation load of the processor 110 and displays the graphic data stored in the video memory 150 on the display 160.

As shown in FIG. 2, the window operating system 210 transfers corresponding graphic commands to the 2D graphic device driver 230 by using a graphic device interface (GDI) 220. The 2D graphic device driver 230 sets the register content of the graphic chip 140 based on the graphic command transferred by the GDI 220. The hardware of the graphic chip 140 then performs graphic commands corresponding to the register content to accelerate execution of the graphic command.

The GDI 220 transfers ROP3 (Raster-Operation 3) graphic commands defined by the window operating system 210. Each ROP3 command performs a Boolean operation for source pixels (S), destination pixels (D) and a pattern (P). The source pixels (S) and the destination pixels (D) specify memory addresses corresponding to pixels in the system memory 130 or the video memory 150. For example, a command ROP3=0×BA(DPSnao) specifies a Boolean operation '[(NOT S) AND P] OR D'. That is, the source pixels (S) in the system memory 130 or the video memory 150 are processed by a NOT operation, then an AND operation with a pattern (P), and finally an OR operation with the destination pixels (D) in the system memory 130 or the video memory 150. The result is stored in the system memory 130 or the video memory 150 with respect to the destination pixels (D). When the 2D graphic device driver 230 receives a command ROP3=0×BA, the 2D graphic device driver 230 sets the corresponding registers of the graphic chip 140 based on the command ROP3=0×BA (DPSnao) and accordingly the hardware of the graphic chip 140 performs the NOT, AND and OR operations, and data transfer between memories. The delivery time between the GDI 220 and the 2D graphic device driver 230 for commands and parameters is minimized because a ROP3 graphic command includes all of the source pixel (S), destination pixel (D) and pattern (P) information. Furthermore, processing of graphical operations is accelerated by hardware and thus the processing time is greatly reduced.

The format of a typical command register for executing ROP3 commands by the graphic chip 140 is shown in FIG. 3. As shown, the format has fields to specify source pixel, destination pixel and pattern and color source (CS) information. However, the field for CS has only one bit, and thus it the field for CS is unable to distinguish whether the source pixel or pattern is colored. That is, the hardware of the graphic chip 140 can be utilized to accelerate the execution of corresponding graphic commands when only one of the source pixel or pattern is colored. If the source pixel and pattern are both colored, for example, the S and the P in the command ROP3=0×BA(DPSnao) are colored, the hardware of the graphic chip 140 cannot be utilized to accelerate the execution of graphic commands. Accordingly, one substitution is such that, the command ROP3=0×BA(DPSnao) having color source pixels and color pattern is divided by the 2D graphic device driver 230 into three ROP2 (Raster-Operation 2) commands: (1) (NOT S)>D1; (2) D1 AND P >D1; and (3) D1 OR D>D, and the hardware of the graphic chip 140 is activated to sequentially perform the three ROP2 commands. This increases the complexity of the 2D graphic device driver 230 and reduces the graphical processing speed due to the three ROP2 commands sequentially performed by the hardware of the graphic chip 140. Therefore, the conventional method for accelerating 2D graphics needs to be improved.

SUMMARY OF THE INVENTION

The object of the present invention is to provide a system and method for accelerating 2D graphics in a computer system, which avoids hardware complexity and processing speed reduction caused by rewriting the ROP3 command as the ROP2 commands in the prior art.

In accordance with one aspect of the invention, there is provided a method for accelerating 2D graphics in a computer system. The computer system includes a graphic chip having a command register to execute graphic commands, each graphic command having an operation of source pixel, pattern or destination pixel. The computer system uses a graphic device interface (GDI) to transfer corresponding graphic commands to a 2D graphic device driver. The 2D graphic device driver sets a command register of the graphic chip based on the graphic command transferred by the graphic device interface (GDI) such that the graphic chip performs a graphic command with respect to the command register set by the 2D graphic device driver. The method comprises: a graphic command receiving step, which uses the 2D graphic device driver to receive a graphic command from the graphic device interface (GDI); a graphic command determining step, which uses the 2D graphic device driver to determine whether source pixel and pattern of the graphic command are both colored; a copying step, which performs a copy procedure for copying memory corresponding to the source pixel or the pattern, and converting and expanding its color when the source pixel and the pattern are both colored; and a graphic command executing step, which uses the 2D graphic device driver to set the command register of the graphic chip for executing the graphic command according to the copied source pixel or pattern, the original source pixel or pattern, and the destination pixel.

In accordance with another aspect of the present invention, there is provided a system for accelerating 2D graphics in a computer system, which comprises: a graphic chip having a command register to perform graphic commands, each graphic command having operation of source pixel, pattern or destination pixel; and a 2D graphic device driver to set the command register of the graphic chip based on a graphic command transferred by a graphic device interface (GDI) of the computer system, such that the graphic chip performs a graphic command with respect to the command register set by the 2D graphic device driver. A copy procedure is performed to copy memory corresponding to the source pixel or the pattern and convert and expand its color when the source pixel and pattern of the graphic command received by the 2D graphic device driver are both colored. The 2D graphic device driver sets the command register of the graphic chip to execute the graphic command according to the copied source pixel or pattern, the original source pixel or pattern, and the destination pixel.

Other objects, advantages, and novel features of the invention will become more apparent from the following detailed description when taken in conjunction with the accompanying graphics.

DETAILED DESCRIPTION OF THE PREFERRED EMBODIMENT

Figure 1:
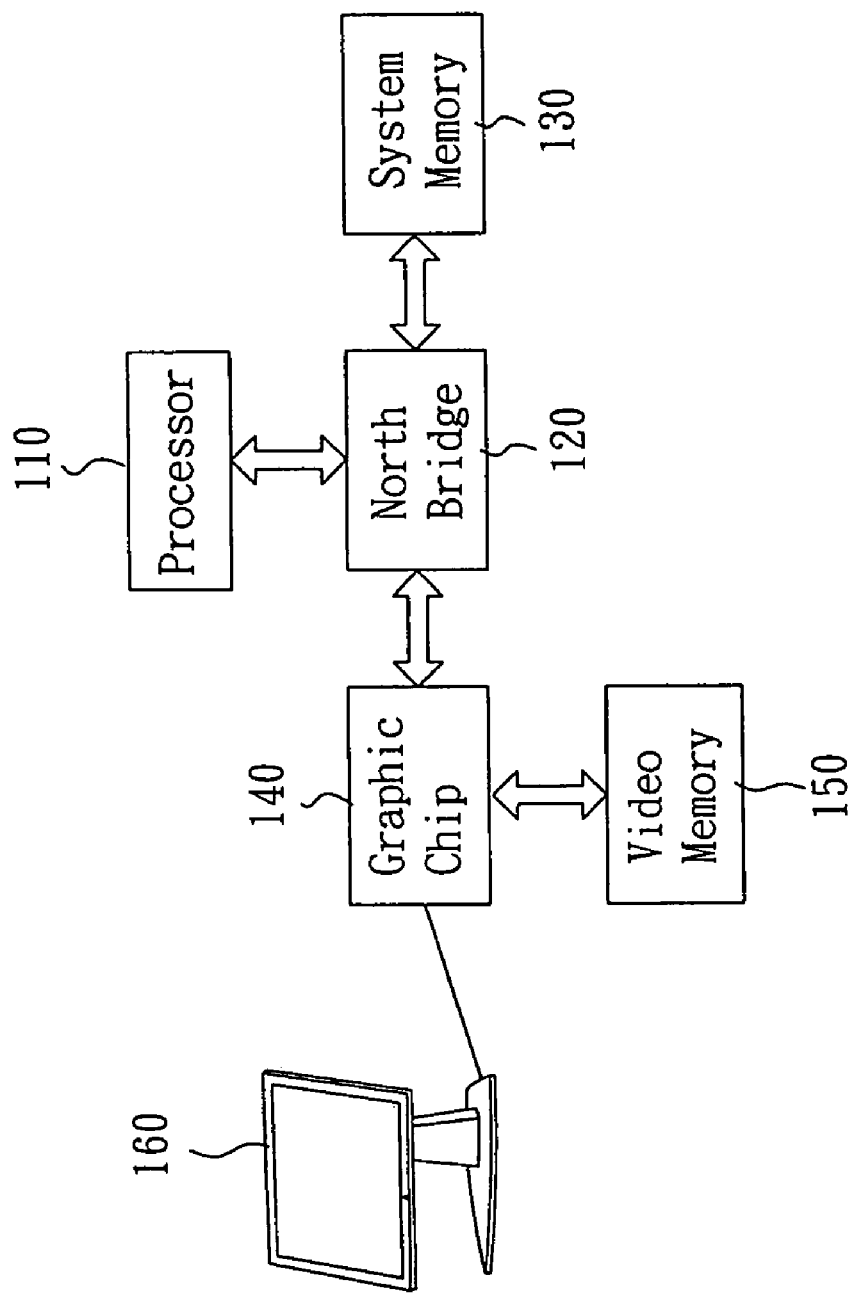
FIG. 1 is a configuration of a typical personal computer system.
Figures 2, 3:
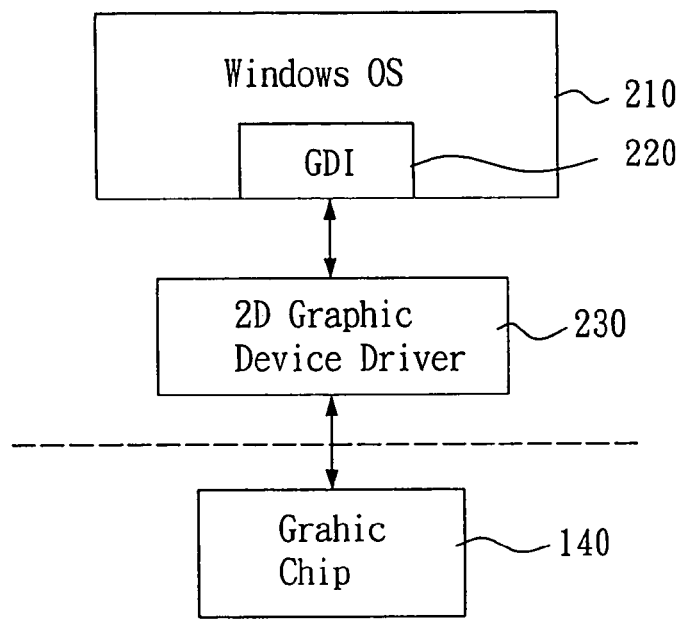
FIG. 2 is a schematic diagram of a typical window operation system and a 2D graphic device driver.
FIG. 3 is a schematic diagram of a format of command register for performing ROP3 in a typical graphic chip.
Figure 4:
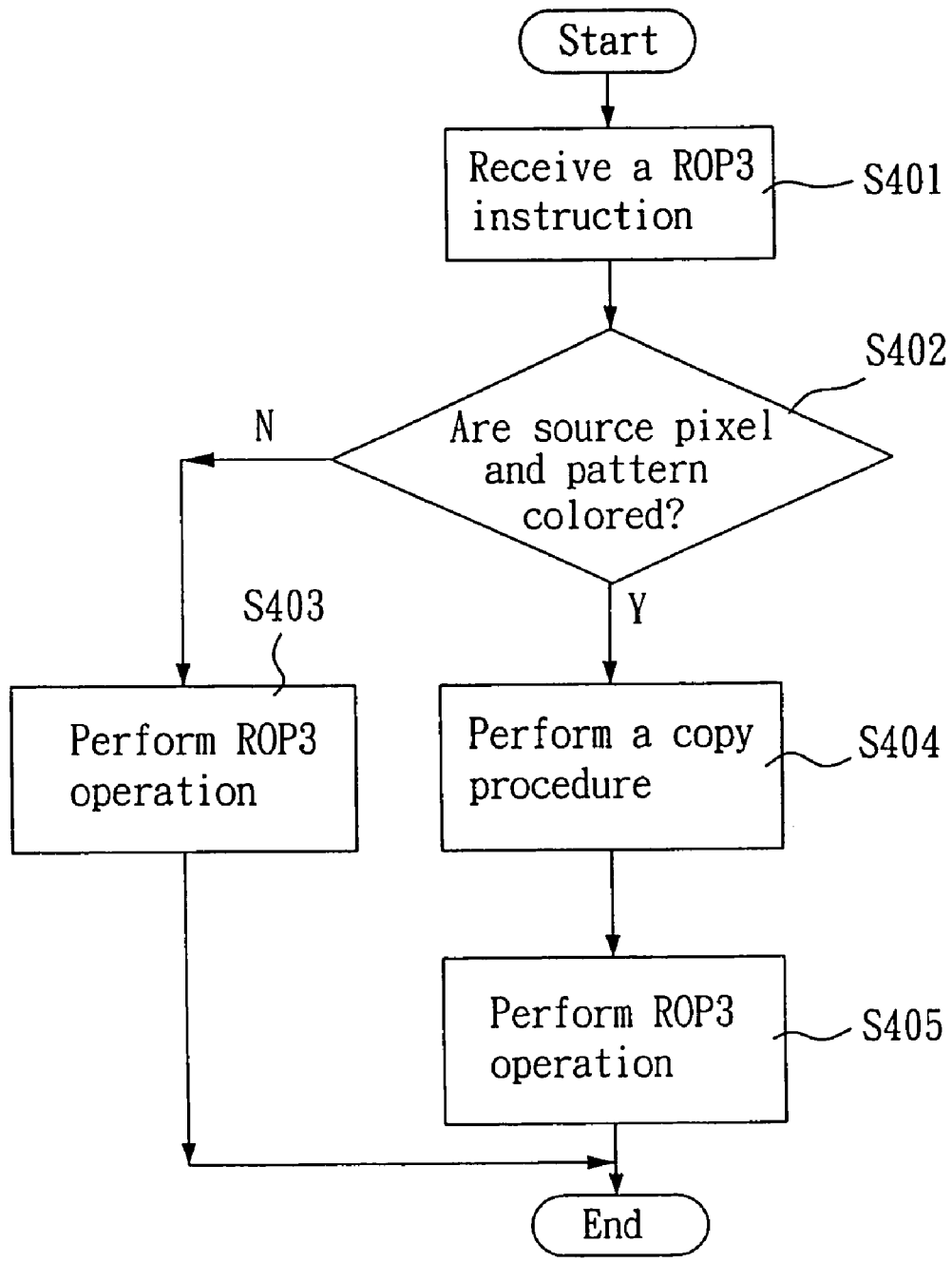
FIG. 4 is a flowchart of a method for accelerating 2D graphics according to the invention.

FIG. 4 shows a flowchart of an inventive method embodiment in conjunction with FIGS. 1–3 in which an environment applied to the inventive system and a method for accelerating 2D graphics are shown. As shown in FIG. 4, in step S401, the 2D graphic device driver 230 receives a ROP3 command from the graphic device interface 220 (GDI). In step S402, the 2D graphic device driver 230 determines whether the source pixel and pattern of the ROP3 command are both colored. If they are not both colored, it indicates that at most one of the source pixel and pattern is colored, so that the color source (CS) field can specify whether the source pixel or the pattern is colored or not. Accordingly, the 2D graphic device driver 230 can set a corresponding register of the graphic chip 140 based on the ROP3 command and activate hardware of the graphic chip 140 to perform the ROP3 command operation (step S403).

On the other hand, if step S402 determines that the source pixel and pattern of the ROP3 command are both colored, the color source (CS) field cannot specify whether the source pixel or the pattern is colored or not. Accordingly, in step S404, the 2D graphic device driver 230 performs a copy procedure for copying memory storing the source pixel or the pattern with respect to the ROP3 command. For example, a memory for the source pixel is copied to a memory for another source pixel (S>S1). The copy procedure also converts color of the source pixel for display, so that the color source field of the command register for executing the ROP3 command does not need to specify whether the source pixel is colored or not, and can be used to specify whether the pattern (P) is colored or not. Alternatively, the copy procedure can copy a memory for the pattern to a memory for another pattern and then convert color of the pattern for display. Therefore, the color source field of the command register for executing the ROP3 command does not need to specify whether the pattern is colored or not, and can be used to specify whether the source pixel is colored or not.

After the copy procedure, because the color source field of the command register for executing the ROP3 command only needs to set either the source pixel and the pattern,it is able to eliminate the problem in that one bit cannot specify both the source pixel and the pattern to be colored in the prior art. Therefore, the 2D graphic device driver 230 can further proceed corresponding settings to the command register of the graphic chip 140 to perform the ROP3 command operation of source pixel (S), pattern (P) and destination pixel (D) (step S405).

FIG. 3 shows the format of a command register for executing the ROP3 command by the graphic chip 140. As shown, the 'Cmd' field (bits 31–24) specifies the command executed by the graphic chip 140. The ROP field (bits 23–16) specifies the ROP3 command. The one-bit color source (CS) field (bit 15) specifies the source pixel or pattern to be colored. The destination clipping (DC) field (bits 14–13) specifies whether the destination pixel is clipped or not after operation.

The DST (destination bitmap) field (bits 12–10) specifies a bitmap descriptor of an assigned destination pixel, wherein a DST field with $011_b$ indicates providing a new primary bitmap descriptor. The ST (source transparency) field (bit 9) specifies a transparent source pixel. The SRC (source bitmap) field (bits 8–5) represents a bitmap descriptor of an assigned source pixel, wherein an SRC field with $0110_b$ indicates providing a new primary bitmap descriptor. The PT (pattern transparency) field (bit 4) specifies a transparent pattern. The PAT (pattern source) field (bits 3–0) specifies a bitmap descriptor of an assigned source pixel, wherein a PAT field with $0110_b$ indicates providing a new primary bitmap descriptor.

Figure 5:
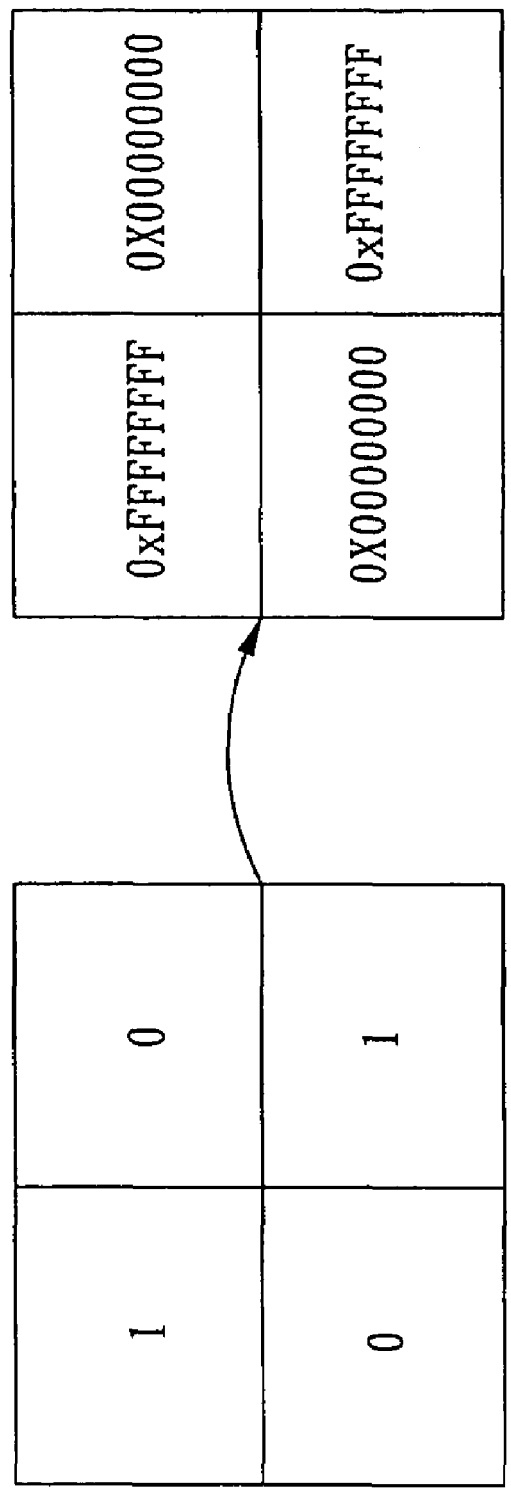
FIG. 5 is a schematic of a copy for color conversion of source pixels according to the invention.

In the above step S404, when the 2D graphic device driver 230 copies a memory for the source pixel to a memory for another source pixel 1(S>S1), it also sets the SRC field as $0110_b$ to indicate providing a new primary bitmap descriptor. The copy procedure converts and expands the color of the source pixel. For example, as shown in FIG. 5, a 2×2 matrix is provided as source pixels, wherein each pixel has one bit, 0 representing a background and 1 representing a foreground. After copying the source pixels to other source pixels, the resultant source pixels are still a 2×2 matrix, but each pixel has 32 bits to respectively specify color information of its original source pixel.

Because the new primary bitmap descriptor can be provided by setting values of the DST field and the PAT field similar to the SRC field, a copy procedure can also be performed to the pattern in step S404 and the color of the pattern is thus converted and expanded.

In view of the foregoing, it is known that the inventive system and method for accelerating 2D graphics uses a copy procedure to convert and expand color of a source pixel or pattern when the pixel and the pattern are both colored in a ROP3 command, and thus divides the ROP3 command into two commands, such as dividing ROP3=0×BA(DPSnao) into (1) (S>S1) and (2) ROP3=0×BA(DPS1nao), thereby avoiding rewriting all ROP3 commands having both color source pixels and color patterns as ROP2 commands. Therefore, the complexity of the 2D graphic device driver is reduced and low processing speed for the accelerated graphic chip is eliminated.

Although the present invention has been explained in relation to its preferred embodiment, it is to be understood that many other possible modifications and variations can be made without departing from the spirit and scope of the invention as hereinafter claimed.

What is claimed is:

1. A method for accelerating 2D graphics in a computer system, the computer system including a graphic chip having a command register to execute graphic commands, each graphic command carrying out an operation on a source pixel, pattern or destination pixel, the computer system using a graphic device interface (GDI) to transfer corresponding a graphic command to a 2D graphic device driver, the 2D graphic device driver setting the command register of the graphic chip based on the graphic command transferred by the graphic device interface (GDI) such that the graphic chip performs the graphic command with respect to the command register set by the 2D graphic device driver, the method comprising:

a graphic command receiving step, which uses the 2D graphic device driver to receive a ROP3 command from the graphic device interface (GDI);

a graphic command determining step, which uses the 2D graphic device driver to determine whether a source pixel and a pattern of the ROP3 command are both colored;

a copying step, which performs a copy procedure for copying memory corresponding to the source pixel or the pattern, and converting and expanding its color when the source pixel and the pattern are both colored; and after the copying step, a graphic command executing step, which uses the 2D graphic device driver to set the command register of the graphic chip for executing the ROP3 command according to the copied source pixel or pattern, the original source pixel or pattern, and the destination pixel.

2. The method as claimed in claim 1, wherein if the graphic command determining step determines that the source pixel and pattern of the graphic command are not both colored, the graphic command executing step is immediately performed.

3. The method as claimed in claim 1, wherein the copying step copies the source pixel to convert and expand color of the source pixel.

4. The method as claimed in claim 1, wherein the copying step copies the pattern to convert and expand color of the pattern.

5. A system for accelerating 2D graphics in a computer system, comprising:

a graphic chip having a command register to perform graphic commands, each graphic command carrying out an operation on a source pixel, a pattern or a destination pixel; and a 2D graphic device driver to set the command register of the graphic chip based on an ROP3 command transferred by a graphic device interface (GDI) of the computer system, such that the graphic chip performs the ROP3 command with respect to the command register set by the 2D graphic device driver, wherein a copy procedure is performed to copy a memory corresponding to the source pixel or the pattern and convert and expand a color of the source pixel or the pattern when the source pixel and pattern of the ROP3 command received by the 2D graphic device driver are both colored, after which the 2D graphic device driver sets the command register of the graphic chip to execute the ROP3 command according to the copied source pixel or pattern, the original source pixel or pattern, and the destination pixel.

6. The system as claimed in claim 5, wherein the copying procedure copies the source pixel to convert and expand color of the source pixel for display.

7. The system as claimed in claim 5, wherein the copying procedure copies the pattern to convert and expand color of the pattern for display.

* * * * *